US010419844B2

(12) United States Patent
Tanabe

(10) Patent No.: US 10,419,844 B2
(45) Date of Patent: Sep. 17, 2019

(54) VEHICLE-MOUNTED ACOUSTIC APPARATUS

(71) Applicant: ALPINE ELECTRONICS, INC., Shinagawa-ku, Tokyo (JP)

(72) Inventor: Kei Tanabe, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 153 days.

(21) Appl. No.: 15/809,286

(22) Filed: Nov. 10, 2017

(65) Prior Publication Data

US 2018/0176677 A1 Jun. 21, 2018

(30) Foreign Application Priority Data

Dec. 20, 2016 (JP) ................................ 2016-246724

(51) Int. Cl.

| | |
|---|---|
| ***H04B 1/00*** | (2006.01) |
| ***H04R 1/28*** | (2006.01) |
| ***H04R 1/02*** | (2006.01) |
| ***H04R 9/06*** | (2006.01) |
| ***H04R 9/02*** | (2006.01) |
| ***H04R 7/12*** | (2006.01) |
| ***H04R 7/18*** | (2006.01) |

(52) U.S. Cl.

CPC ........... *H04R 1/2826* (2013.01); *H04R 1/023* (2013.01); *H04R 1/028* (2013.01); *H04R 7/127* (2013.01); *H04R 7/18* (2013.01); *H04R 9/022* (2013.01); *H04R 9/025* (2013.01); *H04R 9/06* (2013.01); *H04R 1/025* (2013.01); *H04R 1/2834* (2013.01); *H04R 2400/11* (2013.01); *H04R 2499/13* (2013.01)

(58) Field of Classification Search

CPC ....................................................... H04B 1/00

See application file for complete search history.

(56) References Cited

U.S. PATENT DOCUMENTS

| | | | |
|---|---|---|---|
| 7,831,059 | B1 | 11/2010 | Sahyoun |
| 2003/0081808 | A1 | 5/2003 | Kemmerer |

FOREIGN PATENT DOCUMENTS

| | | |
|---|---|---|
| JP | 62-39391 | 3/1987 |
| JP | 2003-299186 | 10/2003 |
| JP | 2004-186898 | 7/2004 |

OTHER PUBLICATIONS

Extended European Search Report for 17208489.9 dated May 23, 2018, 18 pgs.

*Primary Examiner* — Olisa Anwah

(74) *Attorney, Agent, or Firm* — Brinks Gilson & Lione

(57) ABSTRACT

A vehicle-mounted acoustic apparatus includes a frame including an annular portion and a supporting portion and attachable to an opening of a partition plate between an in-cabin space and an outside-cabin space, a diaphragm vibratorily supported by the annular portion, a magnetic circuit supported by the supporting portion and having a magnetic gap, a cylindrical bobbin provided on the diaphragm with one end thereof projecting from one side of the diaphragm, a voice coil wound around the bobbin and positioned in the magnetic gap, and a rear cover member defining an air chamber provided between the rear cover member and the diaphragm. The rear cover member is vibratorily supported and allows back pressure to be conducted to the outside-cabin space. An air path between the air chamber and the in-cabin space follows a route passing through a space on an inner side of the bobbin.

18 Claims, 5 Drawing Sheets

VEHICLE-MOUNTED ACOUSTIC APPARATUS

RELATED APPLICATION

The present application claims priority to Japanese Patent Application Number 2016-246724, filed Dec. 20, 2016, the entirety of which is hereby incorporated by reference.

BACKGROUND

1. Field of the Invention

The present invention relates to a vehicle-mounted acoustic apparatus in which the sound of a speaker attached to a supporting member that separates an in-cabin space and an outside-cabin space of a vehicle from each other is radiated in a vehicle cabin while the back pressure of the speaker is conducted to the outside of the vehicle cabin.

2. Description of the Related Art

In a vehicle-mounted acoustic apparatus in which a speaker is attached directly to a supporting member (a partition) that separates an in-cabin space and an outside-cabin space, such as a space in a door or a space in the engine compartment, from each other, water drops and dust may enter the space in the door from the gap between the window pane and the window frame. On the other hand, the space in the engine compartment is susceptible to the heat radiated from the engine, oil of the engine, and so forth. Therefore, the environment in the outside-cabin space is much more severe than in the in-cabin space.

A known example of such a vehicle-mounted acoustic apparatus is disclosed by Japanese Unexamined Utility Model Registration Application Publication No. 62-39391 in which openings are provided in a door trim and in an inner panel, the sound of a speaker attached to the inner panel is radiated through the openings into a vehicle cabin, and the rear face of the speaker is covered by a rear cover member made of a stretchable material. The rear cover member covers a rear open face of a cylindrical main body enclosing the speaker, whereby a closed space is provided between the rear face of the speaker and the rear cover member.

In the vehicle-mounted acoustic apparatus configured as described above, since the rear face of the speaker that faces the space in the door, which is regarded as an outside-cabin space, is covered by the rear cover member, rainwater and dust having entered the space in the door are prevented from entering the speaker. Moreover, the rear cover member is made of a stretchable and flexible material and is deformable with the vibration of a diaphragm, which is one of components of the speaker. Therefore, the vibration of the diaphragm is gently damped. Accordingly, the bass-sound characteristic is improved.

In the known vehicle-mounted acoustic apparatus disclosed by Japanese Unexamined Utility Model Registration Application Publication No. 62-39391, however, the closed space provided between the rear face of the speaker and the rear cover member may cause the following problems.

Firstly, the volume of the closed space changes with the change in the ambient temperature. With such a change in the volume, the position of the diaphragm that defines the closed space changes. With the change in the position of the diaphragm, the position of a bobbin attached to the diaphragm changes. Consequently, the neutral position of a voice coil, which is wound around the bobbin, in a magnetic circuit changes with the ambient temperature. Needless to say, the instability in the neutral position of the voice coil is unfavorable for providing the stability in the acoustic characteristics of the speaker. That is, the above closed space may deteriorate the controllability of the acoustic characteristics of the speaker.

Secondly, when an electric current is supplied to the voice coil so as to cause the bobbin to undergo a reciprocal motion for vibrating the diaphragm, the vibration of the diaphragm generates a sound pressure in the closed space. The sound pressure thus generated is transmitted through the closed space and vibrates the rear cover member facing the diaphragm. The vibration of the rear cover member occasionally acts advantageously on the acoustic characteristics as described above. However, if the space between the diaphragm and the rear cover member is a closed space, the vibration of the rear cover member may act adversely on the acoustic characteristics because of the following logic. When the relative positions of the diaphragm and the rear cover member change, the volume of the closed space changes. Consequently, the pressure over the entirety of the closed space changes. Such a change in the pressure may hinder the vibration of the diaphragm. This tendency is pronounced when the vibration of the diaphragm and the vibration of the rear cover member are in opposite phase with each other.

Thirdly, when an electric current is supplied to the voice coil so as to vibrate the diaphragm, the voice coil generates heat. If such heat generated when, for example, the diaphragm is vibrated with a large amplitude and cannot be discharged appropriately, the probability increases that critical damage such as the melting of the voice coil may occur. In the acoustic apparatus disclosed by Japanese Unexamined Utility Model Registration Application Publication No. 62-39391, since the voice coil is provided in the closed space, the heat generated from the voice coil tends to accumulate in the closed space and is difficult to discharge to the outside appropriately.

SUMMARY

In view of the above circumstances, the present disclosure provides a vehicle-mounted acoustic apparatus in which weather resistance to the environment outside a vehicle cabin is improved, the deterioration in the controllability of acoustic characteristics is suppressed, and heat generated from a voice coil is appropriately discharged to the outside.

According to an aspect of the present disclosure, there is provided a vehicle-mounted acoustic apparatus (a speaker) that includes a frame including an annular portion and a supporting portion extending from the annular portion, the frame being attachable to an opening provided in a partition plate that separates an in-cabin space and an outside-cabin space from each other; a diaphragm vibratorily supported on an inner side of the annular portion; a magnetic circuit supported by the supporting portion and having a magnetic gap; a bobbin having a cylindrical shape and provided on the diaphragm such that one end of the bobbin projects from one of vibration surfaces of the diaphragm; a voice coil wound around a peripheral face of the bobbin and positioned in the magnetic gap together with a portion of the bobbin; and a rear cover member defining an air chamber provided between the rear cover member and the diaphragm, the rear cover member being vibratorily supported and allowing back pressure to be conducted to the outside-cabin space. An air path between the air chamber and the in-cabin space follows a route passing through a space on an inner side of the bobbin.

With the rear cover member, weather resistance to the environment outside a vehicle cabin can be improved. Furthermore, the air chamber defined between the rear cover member and the diaphragm is provided with the air path reaching an outside space. Therefore, even if the volume of the air chamber changes with the vibration of the diaphragm and the vibration of the rear cover member that is caused by the vibration of the diaphragm, air is exchangeable between the air chamber and the outside space. Hence, the change in the pressure in the air chamber can be suppressed. Consequently, the deterioration in the controllability of acoustic characteristics is suppressed. Moreover, the air path between the air chamber and the outside space follows the route passing through the space on the inner side of the bobbin. Therefore, an air current discharged from the air chamber at the change in the volume of the air chamber or an air current generated when air is taken into the air chamber is allowed to flow through the space on the inner side of the bobbin. With such an air current, heat generated from the voice coil can be appropriately discharged to the outside.

In the above vehicle-mounted acoustic apparatus, the bobbin around which the voice coil is wound and the magnetic circuit may be positioned in the in-cabin space provided across the diaphragm from the air chamber. In such a configuration, the voice coil as a heat source is positioned on the outside of the air chamber. Hence, the air current generated in the air path at the change in the volume of the air chamber can stably cool the voice coil. In contrast, if the voice coil is provided in the air chamber, heat from the voice coil accumulates in the air chamber and the temperature in the air chamber therefore rises. However, in the above aspect of the present disclosure, such a situation can be prevented.

In the above vehicle-mounted acoustic apparatus, it is preferable that the rear cover member and the diaphragm each be made of a non-permeable material. In such a configuration, the generation of the air current at the change in the volume of the air chamber is facilitated along the route passing through the space on the inner side of the bobbin. Consequently, the voice coil can be cooled more stably.

In the above vehicle-mounted acoustic apparatus, the diaphragm may have a through hole that defines a portion of the air path. In such a case, the diaphragm may include a reinforcing member provided on a surface of the diaphragm that is on a side opposite a side from which the bobbin projects, the reinforcing member being provided around the through hole of the diaphragm and having a vent hole that defines a portion of the air path. In such a configuration, the generation of the air current at the change in the volume of the air chamber is occasionally facilitated along the route passing through the space on the inner side of the bobbin. In that case, the voice coil can be cooled more stably.

In the above vehicle-mounted acoustic apparatus, it is preferable that the air path follow a route starting from the air chamber, passing through the space on the inner side of the bobbin and through a space on an outer side of the bobbin, and reaching an outside of the magnetic circuit. In such a configuration, the bobbin and the voice coil wound around the bobbin can be cooled more stably.

In the vehicle-mounted acoustic apparatus according to the above aspect of the disclosure, weather resistance to the environment outside the vehicle cabin can be improved, the deterioration in the controllability of acoustic characteristics can be suppressed, and heat generated from the voice coil can be appropriately discharged to the outside.

DETAILED DESCRIPTION OF THE PREFERRED EMBODIMENTS

Figure 1:
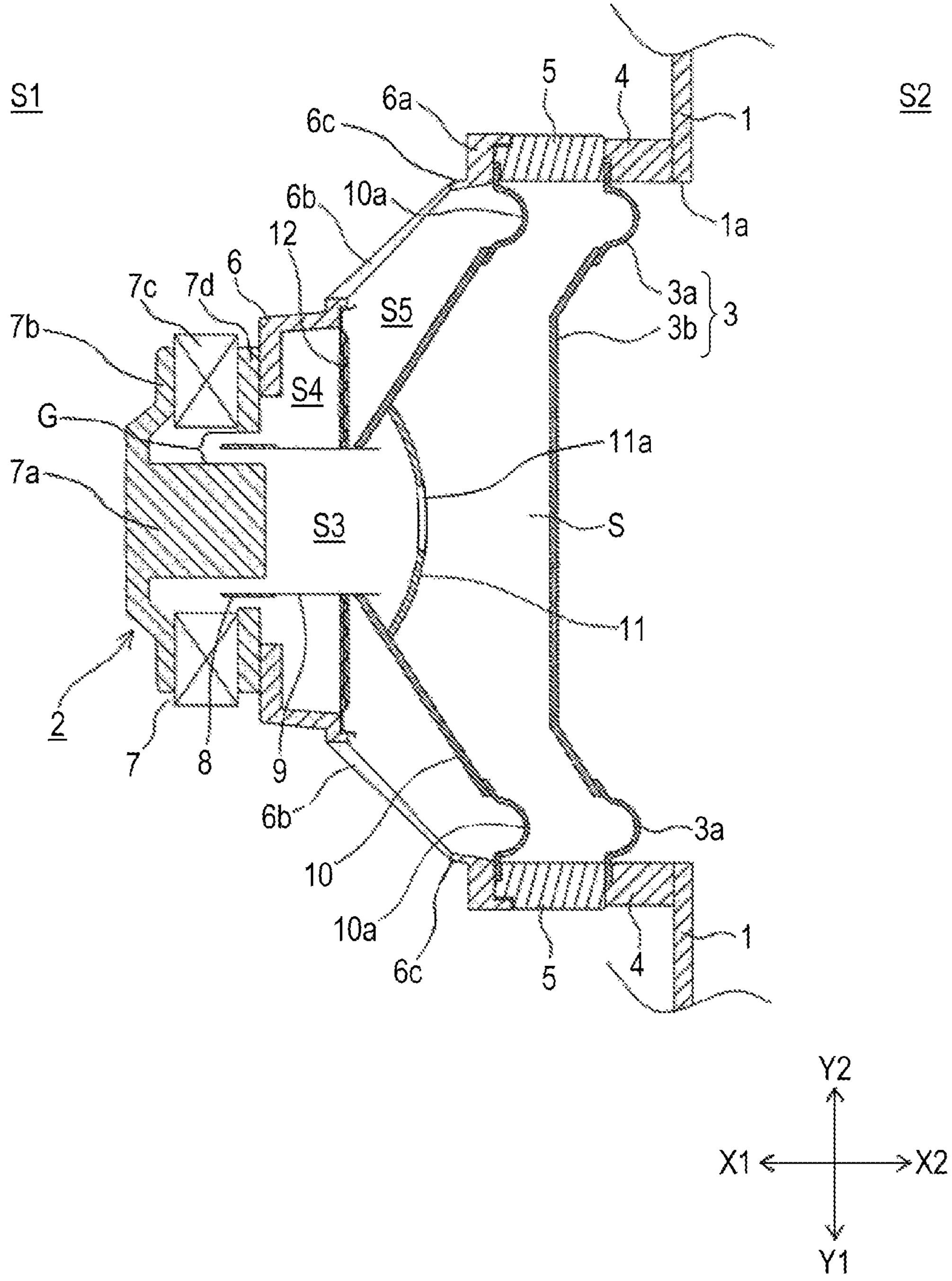
FIG. 1 is a sectional view of a vehicle-mounted acoustic apparatus according to an embodiment of the present invention.

An embodiment of the present invention will now be described with reference to the accompanying drawings. Referring to FIG. 1, a vehicle-mounted acoustic apparatus according to an embodiment of the present invention is a speaker 2 supported by a supporting member 1 that separates an in-cabin space S1 and an outside-cabin space (such as an engine compartment) S2 from each other. A rear cover member 3 is supported by the supporting member 1 in such a manner as to cover the rear face of the speaker 2. The supporting member 1 has an opening 1*a* that allows the in-cabin space S1 and the outside-cabin space S2 to communicate with each other. The rear cover member 3 is fixed to the supporting member 1 in such a manner as to cover the opening 1*a* with a gasket 4 interposed therebetween. The speaker 2 is provided on the front side of the rear cover member 3 with a spacer 5 interposed therebetween. An air chamber S is provided between a diaphragm 10, to be described below, of the speaker 2 and the rear cover member 3.

The speaker 2 basically includes a frame 6 having a substantially truncated conical shape, a magnetic circuit 7 supported by a supporting portion 6*c* of the frame 6, a voice coil 8 provided in a magnetic gap G of the magnetic circuit 7 and driven by electromagnetic interaction with the magnetic circuit 7 when energized, a bobbin 9 having a cylindrical shape and around which the voice coil 8 is wound, the diaphragm 10 having a substantially truncated conical shape and attached to the bobbin 9, a cap 11 having a bowl-like shape and covering the inner peripheral side of the diaphragm 10, a damper 12 elastically supporting the bobbin 9 and the diaphragm 10, and the rear cover member 3 described above. In other words, the bobbin 9 is attached to the diaphragm 10 such that one end thereof projects from one of two vibration surfaces of the diaphragm 10 (in FIG. 1, the bobbin 9 projects toward the X1 side in the X1-X2 direction).

The diaphragm 10 has a through hole at the top of the truncated conical shape thereof. The bobbin 9 is fixedly fitted in the through hole. When the bobbin 9 vibrates in the X1-X2 direction (hereinafter also referred to as "the lateral direction"), the diaphragm 10 vibrates. As to be described below, considering the efficient cooling of the voice coil 8 by utilizing the change in the volume of the air chamber S, the diaphragm 10 is preferably made of a non-permeable material.

The frame 6 includes an annular portion 6*a* having an annular shape and provided on the outer peripheral edge of the frame 6, and the supporting portion 6*c* having a truncated conical shape and extending from the annular portion 6*a*. The annular portion 6*a* is fixed to the supporting member 1 by screwing or the like with the spacer 5 and the gasket 4 interposed therebetween. The diaphragm 10 includes an edge 10*a* on the outer peripheral edge thereof. The edge 10*a* is attached to the annular portion 6*a* of the frame 6. The supporting portion 6*c* having a truncated conical shape has a plurality of cut holes 6*b* provided in the peripheral face thereof. The sound generated with the vibration of the diaphragm 10 is radiated into the in-cabin space S1 through the cut holes 6*b*.

The magnetic circuit 7 includes a center pole portion 7*a* positioned on the inner side of the voice coil 8, a bottom plate 7*b* extending radially from the base end of the center pole portion 7*a*, an annular magnet 7*c* provided on the bottom plate 7*b*, and an annular top plate 7*d* provided on the annular magnet 7*c* and positioned on the outer side of the voice coil 8. The magnetic gap G is provided between the outer surface of the center pole portion 7*a* and the inner surface of the annular top plate 7*d*.

The rear cover member 3 includes an annular flexible member 3*a* made of a highly flexible material such as soft rubber, and a non-flexible diaphragm 3*b* made of a metal material such as heat-resisting resin or aluminum. The annular flexible member 3*a* and the non-flexible diaphragm 3*b* are integrated with each other by bonding or the like. The annular flexible member 3*a* is an annular member having a semicircular sectional shape, with the outer peripheral edge thereof being held between the gasket 4 and the spacer 5, each having a cylindrical shape. The gasket 4 is a ring-shaped packing that seals the gap between the in-cabin space S1 and the outside-cabin space S2. The gasket 4 has the same diameter as the opening 1*a*. The spacer 5 is a cylindrical member interposed between the gasket 4 and the annular portion 6*a* of the frame 6. The edge 10*a* of the diaphragm 10 and the annular flexible member 3*a* of the rear cover member 3 are spaced apart from each other by a length corresponding to the thickness (the dimension in the X1-X2 direction in FIG. 1) of the spacer 5. The non-flexible diaphragm 3*b* is a flat member whose outer periphery is bent. As described above, the air chamber S is provided between the diaphragm 10 and the rear cover member 3. Note that the non-flexible diaphragm 3*b* is not necessarily made of a totally non-flexible member. The non-flexible diaphragm 3*b* may be made of a slightly flexible member, as long as the non-flexible diaphragm 3*b* is satisfactorily stiffer than the annular flexible member 3*a* and does not significantly affect the acoustic characteristics of the speaker 2. As to be described below, considering the efficient cooling of the voice coil 8 by utilizing the change in the volume of the air chamber S, the rear cover member 3 is preferably made of a non-permeable material.

The rear cover member 3 that covers the opening 1*a* is exposed to the outside-cabin space S2. Therefore, the material, the thickness, and other associated factors of each of the annular flexible member 3*a* and the non-flexible diaphragm 3*b* need to be determined with consideration for the environment in the outside-cabin space S2. For example, if the outside-cabin space S2 is the engine compartment, the material may be resistant to radiant heat from the engine, oil of the engine, and so forth.

The cap 11 has a through hole 11*a* at the top of the bow-like shape thereof. The through hole 11*a* allows the air chamber S provided between the diaphragm 10 of the speaker 2 and the rear cover member 3 to communicate with an outside space (the in-cabin space S1 in the present embodiment). Since the through hole 11*a* is provided, an air path extending from the air chamber S to the outside space (the in-cabin space S1) follows a route passing through a space (an in-bobbin space) S3 provided on the inner side of the bobbin 9.

Figure 2:
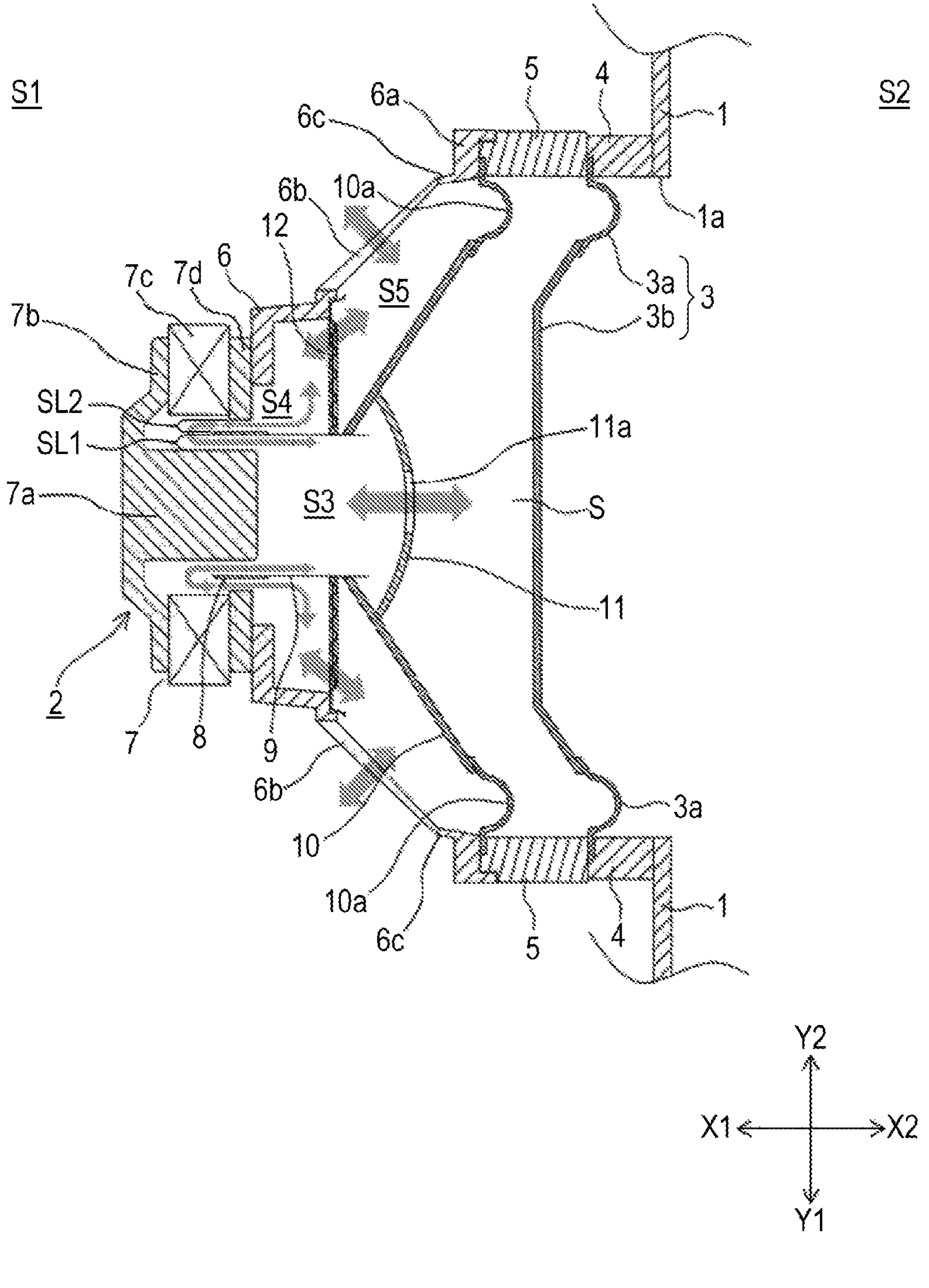
FIG. 2 is a diagram in which a route of an air path provided in the configuration illustrated in FIG. 1 is represented by arrows.

FIG. 2 illustrates the above air path represented by gray arrows. As specifically represented by the arrows in FIG. 2, the air path starting from the air chamber S passes through the through hole 11*a* and reaches the in-bobbin space S3. Then, the air path having reached the in-bobbin space S3 passes through a gap SL1 between the voice coil 8 and the center pole portion 7*a* and through a gap SL2 between the voice coil 8 and the annular top plate 7*d*, reaches a space S4 between the magnetic circuit 7 positioned on the outer side of the bobbin 9 and the damper 12, permeates through the damper 12, reaches a space S5 between the diaphragm 10 and the damper 12, passes through the cut holes 6*b* provided in the frame 6, and reaches the in-cabin space S1. To assuredly provide the air path that follows the above route, the damper 12 preferably has permeability of an appropriate level.

With the air path following the above route, every time the diaphragm 10 undergoes vibration that changes the volume of the air chamber S, an air current that moves the air around the voice coil 8 serving as a heat source is generated, whereby the voice coil 8 is cooled appropriately.

Figure 3A:
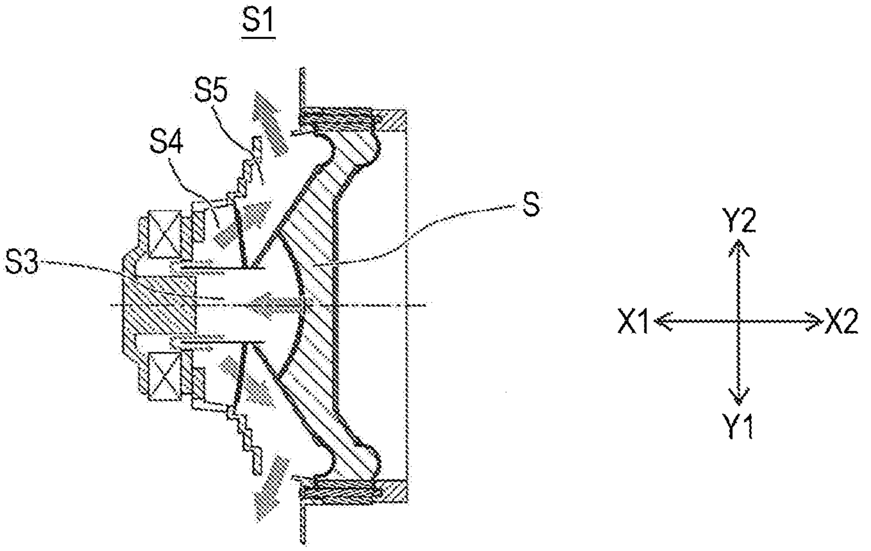
FIGS. 3A and 3B are diagrams illustrating the relationship between the change in the volume of an air chamber and the air current generated in the air path in the vehicle-mounted acoustic apparatus according to the embodiment of the present invention.
Figure 3B:
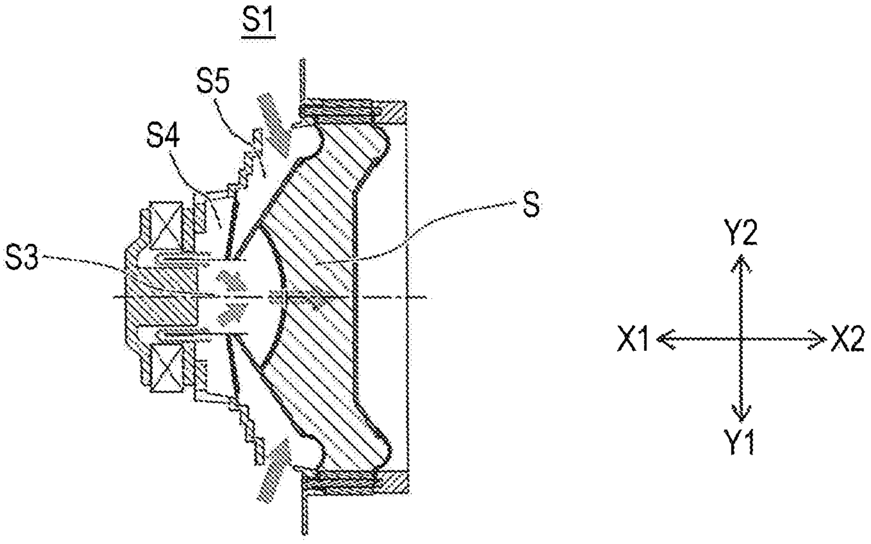

FIGS. 3A and 3B are diagrams illustrating the relationship between the change in the volume of the air chamber S and the air current generated in the air path. Referring to FIG. 3A, when the diaphragm 10 is moved toward the X2 side in the X1-X2 direction and the volume of the air chamber S is therefore reduced, some of the air in the air chamber S is discharged to the in-bobbin space S3. The discharged air then flows from the in-bobbin space S3 to and through the space S4 and the space S5 into the outside space (the in-cabin space S1). Thus, the heat generated from the voice coil 8 is discharged.

Referring now to FIG. 3B, when the diaphragm 10 is moved toward the X1 side in the X1-X2 direction and the volume of the air chamber S is therefore increased, some of the air in the in-bobbin space S3 is taken into the air chamber S, whereby a negative pressure is generated. Then, an air current flowing from the space S4 into the in-bobbin space S3 is generated. The air current then moves air around the voice coil 8 that has been heated by the heat generated from the voice coil 8. Thus, the voice coil 8 is cooled. Note that the above air current eventually generates an air current flowing from the outside space (the in-cabin space S1) and flowing through the space S5 into the space S4.

If the air chamber S is a closed space, the air path following the above route is not provided. Hence, the above cooling process does not occur. Therefore, some other device for appropriately discharging the heat generated from the voice coil 8 may need to be provided.

Figure 4A:
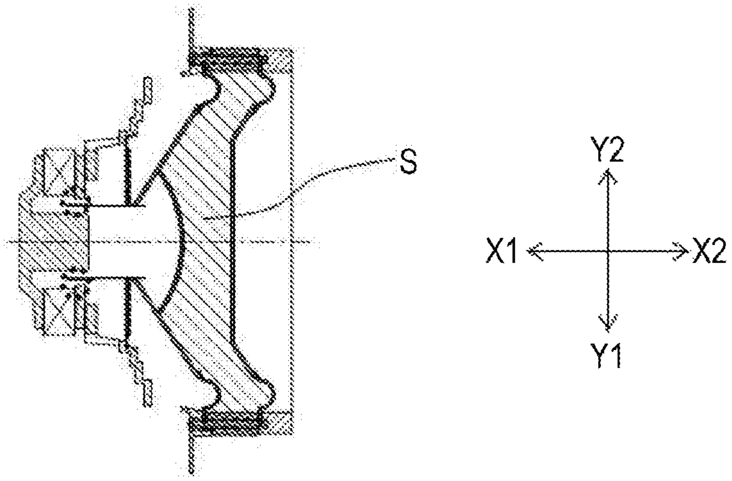
FIGS. 4A to 4C are conceptual diagrams of a vehicle-mounted acoustic apparatus whose air chamber is a closed space and illustrate the dependence of the neutral position of a voice coil included in a speaker upon the ambient temperature.
Figure 4B:
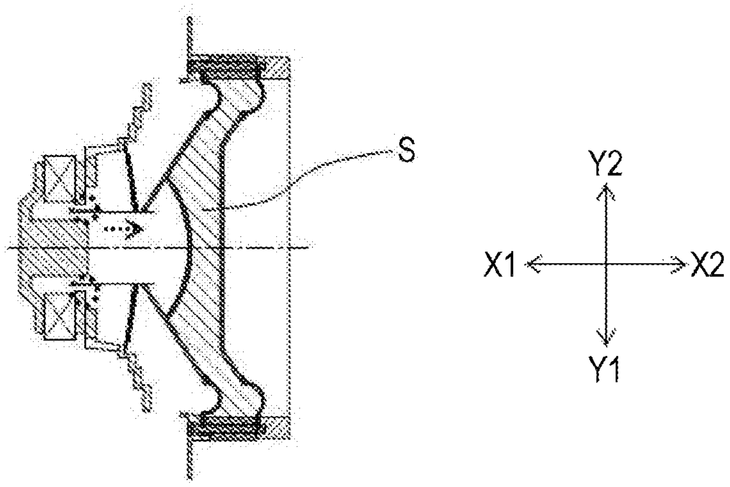
Figure 4C:
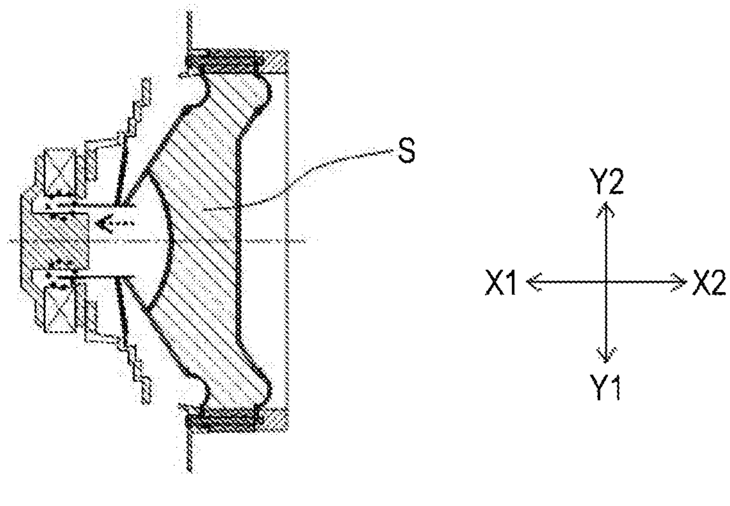

Moreover, if the air chamber S is a closed space, the change in the ambient temperature changes the volume of the closed space. FIGS. 4A to 4C are conceptual diagrams of a vehicle-mounted acoustic apparatus whose air chamber S is a closed space and illustrate the dependence of the neutral position of the voice coil 8 included in the speaker 2 upon the ambient temperature.

In an environment that is at a lower temperature than in a reference environment illustrated in FIG. 4A, the volume of the air chamber S is reduced as illustrated in FIG. 4B, whereby the diaphragm 10 is moved toward the X2 side in the X1-X2 direction (as indicated by a broken-line arrow in FIG. 4B). With the change in the position of the diaphragm 10, the position of the bobbin 9 attached to the diaphragm 10 also changes. Consequently, the neutral position of the voice coil 8, which is wound around the bobbin 9, in the magnetic circuit 7 is shifted toward the X2 side in the X1-X2 direction as encircled by broken lines in FIG. 4B.

On the other hand, in an environment that is at a higher temperature than in the reference environment illustrated in FIG. 4A, the volume of the air chamber S is increased as illustrated in FIG. 4C, whereby the diaphragm 10 is moved toward the X1 side in the X1-X2 direction (as indicated by a broken-line arrow in FIG. 4C). With the change in the position of the diaphragm 10, the position of the bobbin 9 attached to the diaphragm 10 also changes. Consequently, the neutral position of the voice coil 8, which is wound around the bobbin 9, in the magnetic circuit 7 is shifted toward the X1 side in the X1-X2 direction as encircled by broken lines in FIG. 4C.

Needless to say, such instability in the neutral position of the voice coil 8 with the change in the ambient temperature is unfavorable for providing stability in the acoustic characteristics of the speaker 2.

In the vehicle-mounted acoustic apparatus configured as described above, when a sound signal generated by a drive-signal-generating device is input to the voice coil 8 of the speaker 2, the bobbin 9 and the diaphragm 10 vibrate in the lateral direction in FIGS. 4A to 4C (the X1-X2 direction). Then, a negative pressure and a positive pressure are alternately generated in the air chamber S on the rear side of the diaphragm 10. Accordingly, the rear cover member 3 is displaced in the lateral direction in FIGS. 4A to 4C. The rear cover member 3 includes the highly stiff non-flexible diaphragm 3*b* whose outer periphery is supported by the highly flexible annular flexible member 3*a*. Therefore, when the diaphragm 10 vibrates and a sound pressure is applied to the rear cover member 3, the non-flexible diaphragm 3*b* is moved while only the annular flexible member 3*a* is deformed. Hence, the resonance caused by the change in the shape, such as the expansion and contraction or the deformation, of the rear cover member 3 is eliminated. That is, the back pressure is conducted to the in-cabin space S1. Consequently, a flat frequency characteristic is provided over a wide frequency band.

Furthermore, since the inertial resistance of the non-flexible diaphragm 3*b* gently damps the vibration of the diaphragm 10, the bass-sound characteristic is also expected to be improved. Thus, the acoustic characteristics can be controlled by causing the diaphragm 10 and the non-flexible diaphragm 3*b* to interact with each other through the intermediary of the air in the air chamber S. However, if the air chamber S is a closed space, the volume of the closed space changes with the change in the relative positions of the diaphragm 10 and the rear cover member 3, whereby the pressure over the entirety of the closed space changes. Such a pressure change may hinder the vibration of the diaphragm 10. In particular, the increase in the amplitude of the diaphragm 10 may be hindered.

Figure 5A:
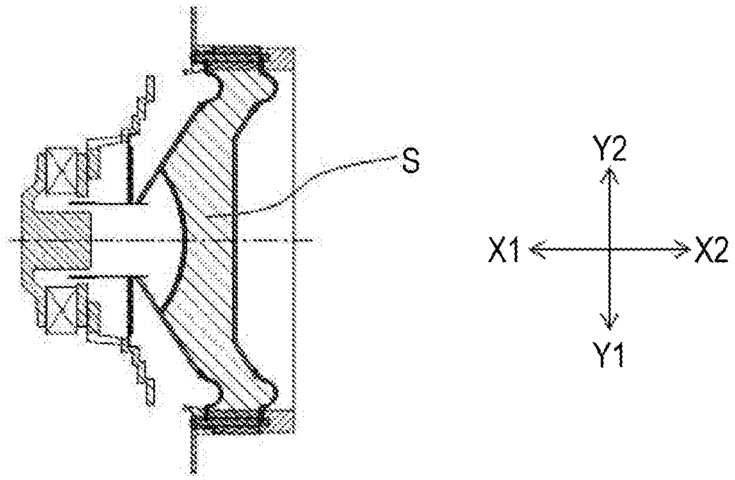
FIGS. 5A to 5C are conceptual diagrams of the vehicle-mounted acoustic apparatus whose air chamber is a closed space and illustrate a diaphragm and a rear cover member that vibrate in opposite phase with each other.
Figure 5B:
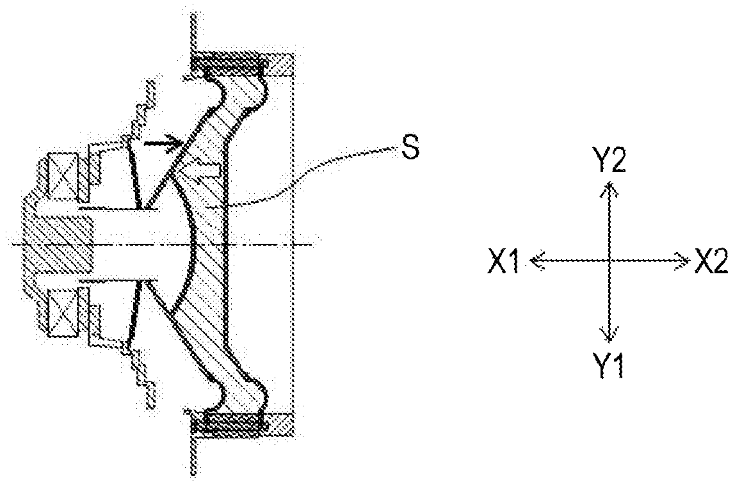
Figure 5C:
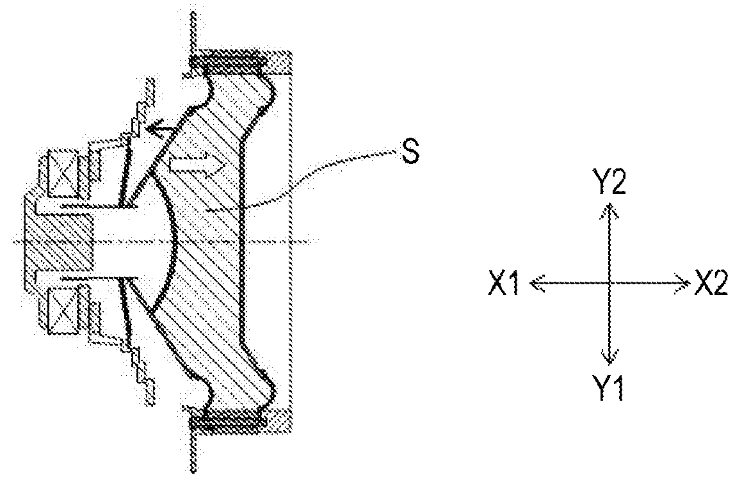

Such a tendency is pronounced if the vibration of the diaphragm 10 and the vibration of the rear cover member 3 are in opposite phase with each other. FIGS. 5A to 5C are conceptual diagrams of the vehicle-mounted acoustic apparatus whose air chamber S is a closed space and illustrate the diaphragm 10 and the rear cover member 3 that vibrate in opposite phase with each other. FIG. 5A illustrates a state where the absolute value of the amplitude of the diaphragm 10 and the absolute value of the amplitude of the rear cover member 3 are both smallest. FIG. 5B illustrates a state where the amplitude of the diaphragm 10 is largest on the X2 side in the X1-X2 direction while the amplitude of the rear cover member 3 is largest on the X1 side in the X1-X2 direction. FIG. 5C illustrates a state where the amplitude of the diaphragm 10 is largest on the X1 side in the X1-X2 direction while the amplitude of the rear cover member 3 is largest on the X2 side in the X1-X2 direction.

In the state illustrated in FIG. 5B, the volume of the air chamber S as a closed space is smallest, and the pressure in the air chamber S is therefore highest. In this state, the movement of the diaphragm 10 in a direction in which the pressure in the air chamber S is further increased, that is, a displacement of the diaphragm 10 toward the X2 side in the X1-X2 direction (indicated by a solid-line arrow in FIG. 5B), is suppressed by the pressure of the air in the air chamber S (represented by a white arrow in FIG. 5B) that acts toward the X1 side in the X1-X2 direction.

On the other hand, in the state illustrated in FIG. 5C, the volume of the air chamber S as a closed space is largest, and the pressure in the air chamber S is therefore lowest. In this state, the movement of the diaphragm 10 in a direction in which the pressure in the air chamber S is further reduced, that is, a displacement of the diaphragm 10 toward the X1 side in the X1-X2 direction (indicated by a solid-line arrow in FIG. 5C), is suppressed by the pressure of the air in the air chamber S (represented by a white arrow in FIG. 5C) that acts toward the X2 side in the X1-X2 direction.

In contrast, in the speaker 2 according to the present embodiment, the air chamber S is not a closed space. Therefore, air is exchangeable between the air chamber S and the outside space. Hence, even if the vibration of the diaphragm 10 and the vibration of the rear cover member 3 are in opposite phase with each other, the above force that suppresses the displacement of the diaphragm 10 is less likely to occur.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

For example, while the speaker 2 described above includes the bobbin 9 around which the voice coil 8 is wound and the magnetic circuit 7 that are positioned in the in-cabin space S1 provided across the diaphragm 10 from the air chamber S, the present invention is not limited to such a configuration. The bobbin 9 around which the voice coil 8 is wound and the magnetic circuit 7 may be positioned in the air chamber S. In such a case also, it is preferable, in terms of efficient cooling of the voice coil 8, that the air path provided between the air chamber S and the outside space follow a route passing through the spaces on the inner side and on the outer side of the bobbin 9 in such a manner as to actively generate an air current that moves the air around the bobbin 9 and the voice coil 8.

Furthermore, while the speaker 2 described above includes the cap 11 having the through hole 11*a* at the top thereof, the present invention is not limited to such a configuration. The through hole 11*a* may be provided at any position of the cap 11 other than the top of the cap 11. Moreover, the diameter of the through hole 11*a* may be close to the outside diameter of the cap 11, and the cap 11 may therefore have a substantially ring-like shape. In such a case also, the cap 11 can serve as a reinforcing member that enhances the stiffness around the through hole provided in the diaphragm 10.

What is claimed is:

1. A vehicle-mounted acoustic apparatus comprising:

a frame including an annular portion and a supporting portion extending from the annular portion, the frame being attachable to an opening provided in a partition plate that separates an in-cabin space and an outside-cabin space from each other;

a diaphragm vibratorily supported on an inner side of the annular portion;

a magnetic circuit supported by the supporting portion and having a magnetic gap;

a bobbin having a cylindrical shape and provided on the diaphragm such that one end of the bobbin projects from one of vibration surfaces of the diaphragm;

a voice coil wound around a peripheral face of the bobbin and positioned in the magnetic gap together with a portion of the bobbin; and a rear cover member defining an air chamber provided between the rear cover member and the diaphragm, the rear cover member being vibratorily supported and allowing back pressure to be conducted to the outside-cabin space, wherein an air path between the air chamber and the in-cabin space follows a route passing through a space on an inner side of the bobbin, and the magnetic circuit is provided across the diaphragm from the air chamber.

2. The vehicle-mounted acoustic apparatus according to claim 1, wherein the bobbin around which the voice coil is wound and the magnetic circuit are positioned in the in-cabin space provided across the diaphragm from the air chamber.

3. The vehicle-mounted acoustic apparatus according to claim 1, wherein the rear cover member and the diaphragm are each made of a non-permeable material.

4. The vehicle-mounted acoustic apparatus according to claim 1, wherein the diaphragm has a through hole that defines a portion of the air path.

5. The vehicle-mounted acoustic apparatus according to claim 4, wherein the diaphragm includes a reinforcing member provided on a surface of the diaphragm that is on a side opposite a side from which the bobbin projects, the reinforcing member being provided around the through hole of the diaphragm and having a vent hole that defines a portion of the air path.

6. The vehicle-mounted acoustic apparatus according to claim 1, wherein the air path follows a route starting from the air chamber, passing through the space on the inner side of the bobbin and through a space on an outer side of the bobbin, and reaching an outside of the magnetic circuit.

7. A vehicle-mounted acoustic apparatus comprising:

a frame including an peripheral portion and a supporting portion extending from the peripheral portion, the frame being attachable to an opening provided in a partition plate that separates an in-cabin space and an outside-cabin space from each other;

a diaphragm vibratorily supported on an inner side of the peripheral portion;

a magnetic circuit supported by the supporting portion and having a magnetic gap;

a bobbin provided on the diaphragm such that one end of the bobbin projects from one of vibration surfaces of the diaphragm;

a voice coil wound around a peripheral face of the bobbin and positioned in the magnetic gap together with a portion of the bobbin; and a rear cover member facing the diaphragm and defining an air chamber provided between the rear cover member and the diaphragm, the rear cover member being vibratorily supported and allowing back pressure to be conducted to the outside-cabin space, wherein an air path between the air chamber and the in-cabin space follows a route passing through a space on an inner side of the bobbin.

8. The vehicle-mounted acoustic apparatus according to claim 7, wherein the bobbin around which the voice coil is wound and the magnetic circuit are positioned in the in-cabin space provided across the diaphragm from the air chamber.

9. The vehicle-mounted acoustic apparatus according to claim 7, wherein the rear cover member and the diaphragm are each made of a non-permeable material.

10. The vehicle-mounted acoustic apparatus according to claim 7, wherein the diaphragm has a through hole that defines a portion of the air path.

11. The vehicle-mounted acoustic apparatus according to claim 10, wherein the diaphragm includes a reinforcing member provided on a surface of the diaphragm that is on a side opposite a side from which the bobbin projects, the reinforcing member being provided around the through hole of the diaphragm and having a vent hole that defines a portion of the air path.

12. The vehicle-mounted acoustic apparatus according to claim 7, wherein the air path follows a route starting from the air chamber, passing through the space on the inner side of the bobbin and through a space on an outer side of the bobbin, and reaching an outside of the magnetic circuit.

13. A vehicle-mounted acoustic apparatus comprising:

a frame including a peripheral portion and a supporting portion extending from the peripheral portion;

a diaphragm vibratorily supported on an inner side of the peripheral portion;

a magnetic circuit supported by the supporting portion and having a magnetic gap;

a bobbin provided on the diaphragm such that one end of the bobbin projects from one of vibration surfaces of the diaphragm;

a voice coil wound around a peripheral face of the bobbin and positioned in the magnetic gap together with a portion of the bobbin; and a rear cover member defining an air chamber provided between the rear cover member and the diaphragm, the rear cover member being vibratorily supported and allowing back pressure to be conducted to space in a rear of the acoustic apparatus, wherein an air path between the air chamber and space in a front of the acoustic apparatus follows a route passing through a space on an inner side of the bobbin and across at least a portion of the bobbin around which the voice coil is wound to discharge heat generated from the voice coil.

14. The vehicle-mounted acoustic apparatus according to claim 13, wherein the bobbin around which the voice coil is wound and the magnetic circuit are positioned across the diaphragm from the air chamber.

15. The vehicle-mounted acoustic apparatus according to claim 13, wherein the rear cover member and the diaphragm are each made of a non-permeable material.

16. The vehicle-mounted acoustic apparatus according to claim 13, wherein the diaphragm has a through hole that defines a portion of the air path.

17. The vehicle-mounted acoustic apparatus according to claim 16, wherein the diaphragm includes a reinforcing member provided on a surface of the diaphragm that is on a side opposite a side from which the bobbin projects, the reinforcing member being provided around the through hole of the diaphragm and having a vent hole that defines a portion of the air path.

18. The vehicle-mounted acoustic apparatus according to claim 13, wherein the air path follows a route starting from the air chamber, passing through the space on the inner side of the bobbin and through a space on an outer side of the bobbin, and reaching an outside of the magnetic circuit.

* * * * *